United States Patent [19]
O'Neil

[11] Patent Number: 5,806,808
[45] Date of Patent: Sep. 15, 1998

[54] AIRFOIL LIFT MANAGEMENT DEVICE

[75] Inventor: Patrick J. O'Neil, Florissant, Mo.

[73] Assignee: McDonnell Douglas Corp., St. Louis, Mich.

[21] Appl. No.: 929,133

[22] Filed: Sep. 5, 1997

Related U.S. Application Data

[63] Continuation of Ser. No. 444,548, May 19, 1995, abandoned.

[51] Int. Cl.$^6$ .................................................. B64C 9/22
[52] U.S. Cl. ..................... 244/213; 244/204; 244/208; 244/201
[58] Field of Search ................ 244/75 R, 201, 244/204, 213, 208, 210

[56] References Cited

U.S. PATENT DOCUMENTS

| | | | |
|---|---|---|---|
| 1,499,064 | 6/1924 | Kuipers . | |
| 1,530,635 | 3/1925 | Adams . | |
| 1,829,616 | 10/1931 | Stalker | 244/208 |
| 2,077,071 | 4/1937 | Rose . | |
| 2,426,334 | 8/1947 | Banning | 244/41 |
| 2,646,945 | 7/1953 | Perry | 244/204 |
| 3,128,973 | 4/1964 | Dannenberg | 244/130 |
| 3,831,886 | 8/1974 | Burdges et al. | 244/214 |
| 4,392,621 | 7/1983 | Viets | 244/204 |
| 4,575,030 | 3/1986 | Gratzer | 244/209 |
| 4,664,345 | 5/1987 | Lurz | 244/208 |
| 4,726,548 | 2/1988 | Clites | 244/209 |
| 5,167,387 | 12/1992 | Hartwich | 244/200 |
| 5,257,088 | 10/1993 | Tyson et al. . | |

FOREIGN PATENT DOCUMENTS

| | | | |
|---|---|---|---|
| 311164 | 9/1933 | Italy | 244/208 |
| 304973 | 1/1929 | United Kingdom | 244/204 |
| 2093152 | 8/1982 | United Kingdom | 244/198 |

OTHER PUBLICATIONS

Miller, A Novel Concept for Subsonic Inlet Boundary–Layer Control, *Journal of Aircraft*, vol. 14, No. 4, Apr., 1977, pp. 403–404.

Bahi et al., Passive Shock Wave/Boundary Layer Control for Transonic Airfoil Drag Reduction, AIAA–83–0137, Jan. 10–13, 1983. pp. 1–11.

Nagamatsu et al., Porosity Effect on Supercritical Airfoil Drag Reduction by Shock Wave/Boundary Layer Control, AIAA–84–1682, Jun. 1984, pp. 1–6.

Hsiung et al., Drag Reduction of Transonic Projectile by Porous Surface, AIAA–93–0417, Jan. 11–14, 1993, pp. 1–11.

Chen et al., Computation of Viscous Transonic Flow Over Porous Airfoils, AIAA–92–2711, January 12–15, 1987, pp. 1–16.

Bauer et al., Alleviation of Side Force on Tangent–Ogive Forebodies Using Passive Porosity, AIAA–92–2711, Jun. 22–24, 1992, pp. 1–12.

Savu et al., Porous Airfoils in Transonic Flow, *AIAA Journal*, vol. 22, No. 7, Jul. 1984, pp. 989–991.

Savu et al., Analytical Solutions for Hypersonic Flow Over the Porous Surfaces, AIAA–93–5113, Nov. 30–Dec. 3, 1993, pp. 1–5.

Hartwich et al., Experimental Study on Porous Transonic Airfoils with a View Toward Multipoint Design, AIAA–94–0500, Jan. 10–13, 1994, pp. 1–9.

*Primary Examiner*—Robert J. Oberleitner
*Assistant Examiner*—Tien Dinh
*Attorney, Agent, or Firm*—Bryan Cave LLP; David A. Roodman

[57] ABSTRACT

A passive porosity airfoil lift management device employed on a leading edge region of said airfoil whereby the lift on said airfoil may be varied and controlled by passively transferring air pressure between the upper surface and lower surfaces of said leading edge region of the airfoil through upper and lower porous skin regions, upper and lower plenum cavities disposed in said airfoil, and controllably monitoring and regulating said passive air pressure transference with at least one valve and a microprocessor.

21 Claims, 3 Drawing Sheets

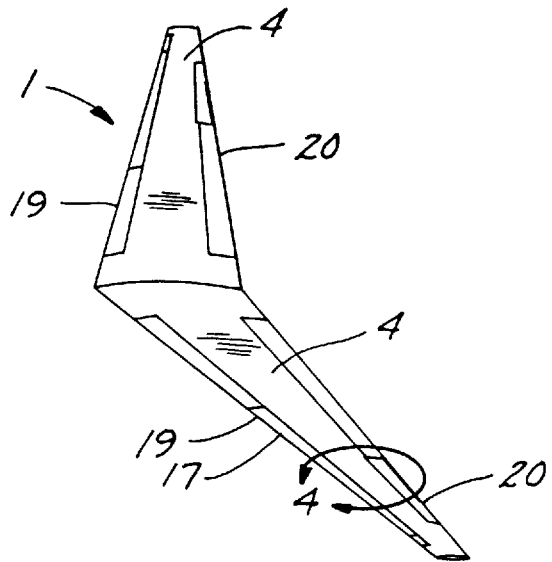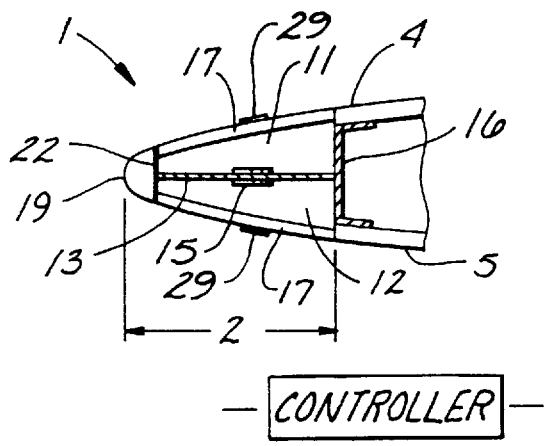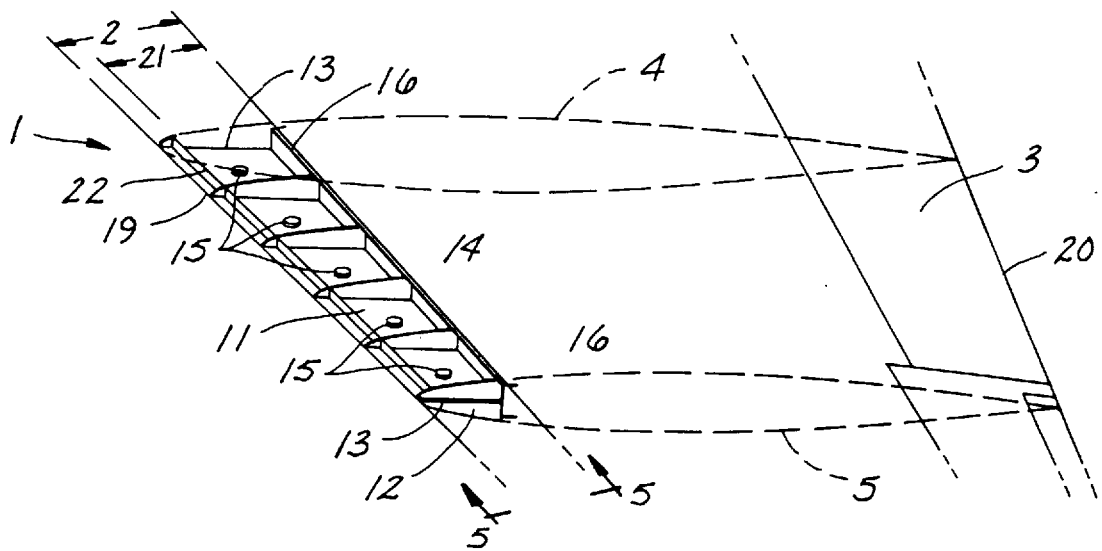

AIRFOIL LIFT MANAGEMENT DEVICE

This is a continuation, application under 37 CFR Section 1.62, or prior pending U.S. application Ser. No. 08/444,548, filed May 19, 1995, now abandoned.

BACKGROUND OF THE INVENTION

1. Field of the Invention

The present invention relates generally to airfoil lift management systems and more particularly to the use of passive porosity in combination with controlled transference of air pressures on the leading edge regions of airfoils for use as a lift management device.

2. Description of the Prior Art

Conventional non-porous airfoils typically utilize various mechanical structures, such as spoilers and associated structural and actuation hardware, in order to alter, vary and control the lift on an airfoil. Spoilers are typically comprised of at least one structural member which is movably connected to an airfoil, with various types of mechanical hardware, such that the structural member may be hydraulically, pneumatically, or otherwise mechanically raised into the airstream on at least one side of an airfoil in order to interrupt the air flow over the respective surface of the airfoil. Such devices are used to achieve a variety of objectives including, for example, to provide roll control, direct lift control, increased drag to facilitate greater engine power requirements (some engines have improved performance characteristics when operated at increased power levels), a reduction in altitude gain during aircraft landing (sometimes referred to as flap anti-ballooning), and to increase drag and reduce velocity (sometimes referred to as "air brakes").

Conventional hydraulic, pneumatic, and other mechanical devices (such as spoilers), including the structural and actuation hardware related thereto, utilized to alter, vary and control lift are subjected to various static and dynamic forces, loads, pressures, stresses, strain, wear, and fatigue which result in reducing the life and accelerated failure of the various components. Of course, as the structural and actuation hardware are fastened or otherwise affixed to the airfoil itself, the static and dynamic forces, loads, pressures, stresses, and strains which occur in or upon the structural components and actuation hardware are transferred or otherwise transmitted to portions of the airfoil itself resulting in wear, fatigue and a reduction in the useful life of the wing structure itself. Reducing or eliminating such forces and wear upon such components, and upon wings in general, would serve to increase the reliability, useful life, and safety of any aircraft, vehicles, or other devices which utilize conventional lift control mechanisms.

Conventional mechanical lift control mechanisms, such as spoilers, and their related structural components and actuation hardware, utilize a substantial amount of beneficial area and mass. The mass attributable to conventional mechanical lift control mechanisms result in decreased usable space, heavier crafts, decreased fuel efficiency, and increased loads. In airfoil applications, the efficient utilization of useable area and mass is extremely important. If the amount of area and mass required to employ lift control mechanisms, such as spoilers, could be partially or totally eliminated, such area and mass could be employed for other useful purposes such as, for example, additional or increased passenger or cargo capacity, fuel storage, instrumentation, or armament storage.

Through the use of passive porosity and the controlled transference of air pressures on the leading edge region of an airfoil, the present invention partially or completely eliminates the need for conventional mechanical lift control mechanisms, such as spoilers, and the associated structures, actuation devices, support hardware, hydraulic systems, and other related components thereto, thereby increasing the amount of usable area and space on and in an airfoil, decreasing the number of required moving parts, decreasing the amount of mass necessary to achieve the results previously only performed by mechanical structures such as spoilers, and eliminating the various static and dynamic forces, loads, pressures, stresses, strain, wear, and fatigue which result from conventional mechanical lift control mechanisms. Additionally, as the present invention will partially or completely eliminate the mechanical disruption of airflow as accomplished by conventional spoilers, thereby partially or completely eliminating the need to physically maneuver mechanical spoiler structures into an airstream, the present invention will result in substantially improved acoustic signatures and decreased reflective surfaces.

The general use of porous skin regions on airfoils is disclosed in U.S. Pat. Nos. 5,167,387, 4,575,030, and 4,726,548. In an attempt to improve lift and drag characteristics at subcritical and supercritical conditions, U.S. Pat. No. 5,167,387 uses porous airfoil skin surfaces to vent air pressure from the leading edge region to the trailing edge region of an airfoil in order to alter the effective airfoil thickness. U.S. Pat. No. 4,575,030 uses active suction mechanisms in connection with porous airfoil skin surfaces in an attempt to control the laminar flow over an aircraft wing. U.S. Pat. No. 4,726,548 uses porous airfoil skin surfaces in an effort to draw boundary layer air into an airfoil and then evacuate such air at the end of the airfoil in order to improve drag characteristics. U.S. Pat. No. 2,077,071 discloses a boundary layer control mechanism for airfoils.

The disadvantages of the prior art are overcome by the present invention which uses passive porosity in combination with controlled venting or transference of air pressures on the leading edge region of an airfoil for use as a lift management device thereby partially or completely eliminating conventional mechanical components and systems for altering, varying and controlling lift. The present lift management invention results in a decreased amount of moving parts, improved airfoil acoustic signatures, improved efficiency and reliability, decreased amount of mass necessary to achieve lift management, and the elimination or reduction of separate control surfaces and related hardware required to achieve lift management by conventional means. Further advantages of the present invention will be recognized by those skilled in the art.

SUMMARY OF THE INVENTION

The present invention is a lift management device and process for an airfoil which permits the controlled venting and transference of air utilizing passive porosity on the leading edge region of an airfoil. The present invention preferably has one or more outer porous skin regions on the upper surface of the leading edge region of an airfoil and one or more outer porous skin regions on the lower surface of the leading edge region of an airfoil. The porous skin regions preferably have a plurality of perforations therethrough. Each of the porous skin regions on the upper surface of the leading edge region are preferably in fluid communication with at least one upper plenum cavity disposed in the interior portion of the airfoil and each of the porous skin regions on the lower surface of the leading edge region are preferably in fluid communication with at least one lower plenum cavity disposed in the interior portion of the leading edge region of the airfoil. In a preferred embodiment, air on the outer upper surface of the outer porous skin regions on the leading edge region of the airfoil will preferably cause, through the passive transmission of air through the porous skin regions, certain air pressures to develop in corresponding upper plenum cavities. Likewise, air on the outer lower surface of the outer porous skin regions on the leading edge region of the airfoil will preferably cause certain air pressure to develop in corresponding lower plenum cavities. The air pressure in upper plenum cavities directly correlate to the air pressure on corresponding outer upper surfaces of the leading edge region of an airfoil. Similarly, the air pressure in lower plenum cavities directly correlate to the air pressures on corresponding outer lower surfaces of the leading edge region of an airfoil. Corresponding upper plenum cavities are preferably connectably coupled to corresponding lower plenum cavities so that the interaction and communication between the air in the respective corresponding upper plenum cavities and lower plenum cavities may be controlled and regulated. In one presently preferred embodiment of the invention, a plurality of valves preferably link upper plenum cavities with corresponding lower plenum cavities. A means for controllably monitoring and regulating the means for connectably coupling corresponding upper plenum cavities with corresponding lower plenum cavities may preferably be used in the present invention. Through the preferable controlled passive venting of air between corresponding upper and lower plenum cavities, and corresponding outer upper and lower porous skin surfaces on the leading edge region of an airfoil, the present invention provides the ability to control, reduce, modify, vary or otherwise effect lift on an airfoil.

BRIEF DESCRIPTION OF THE DRAWINGS

To facilitate further description of the invention, the following drawings are provided in which:

FIG. 3 is a perspective view similar to FIG. 1, of the upper surfaces of an aircraft wing incorporating a preferred embodiment of the present invention;

FIG. 4 is a cross-sectional perspective view, similar to FIG. 2, of the aircraft wing of FIG. 3 utilizing a preferred embodiment of the present invention;

FIG. 5 is a cross-sectional view of the leading edge region of the aircraft wing of FIGS. 3 and 4 utilizing the preferred embodiment of the present invention taken along section A—A in FIG. 4;

These drawings are provided for illustrative purposes only and should not be used to unduly limit the scope of the invention.

DETAILED DESCRIPTION OF THE PREFERRED EMBODIMENT

Figure 1:
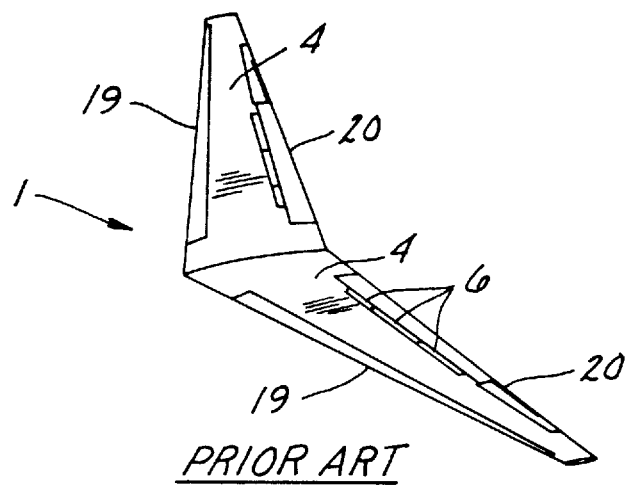
FIG. 1 is a perspective view of the upper surfaces of a conventional prior art aircraft wing.
Figure 2:
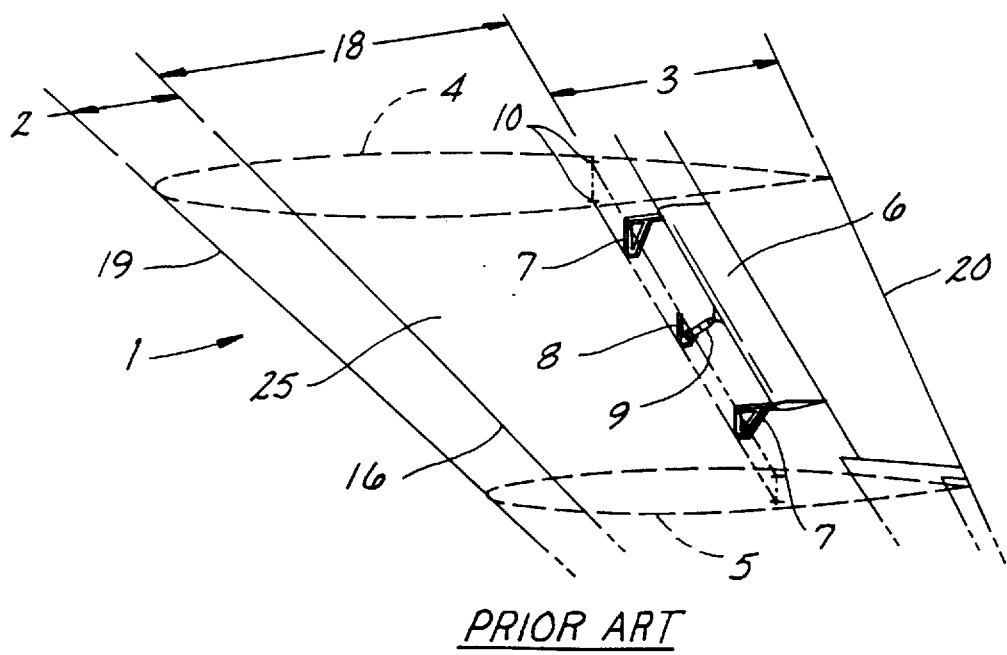
FIG. 2 is a cutaway perspective view of a spoiler used on a conventional aircraft wing.

Referring now to the drawings, and more particularly to FIGS. 1 and 2, a conventional airfoil 1, such as those used on aircraft, is comprised of three primary regions, a leading edge region 2 which extends chordwise from the leading edge 19 of the airfoil 1 to the front spar 16, a trailing edge region 3 which extends chordwise from the aft spar 10 to the trailing edge 20 of the airfoil 1, and a wing box region 18 which extends chordwise from the front spar 16 to the aft spar 10 of the airfoil 1.

Conventional airfoils, such as aircraft typically employ, utilize at least one mechanical structure, such as spoilers 6 (FIG. 2), in order to alter, vary and control the airflow on the upper surface 4 of the airfoil 1. As shown in FIGS. 1 and 2, spoilers 6 are commonly employed on the trailing edge region 3 of an airfoil 1. Such devices are used to achieve a variety of objectives including, for example, to provide roll control, direct lift control, increased drag to facilitate greater engine power requirements (some engines provide improved performance characteristics when operated at increased power levels), a reduction in altitude gain during aircraft landing (sometimes referred to as flap anti-ballooning), and to increase drag and reduce velocity (sometimes referred to as "air brakes"). When employed, spoilers 6 are typically pivotally raised into the airstream over the upper surface 4 of an airfoil 1 thereby disrupting the airflow over the upper surface 4 of an airfoil 1 causing an increase in the air pressure on the upper surface 4 relative to the lower surface 5 of an airfoil 1, resulting in a reduction in lift. At all other times, when not employed, spoilers 6 typically remain in relative linear alignment with the upper surface 4 of an airfoil 1. Spoilers 6 are movably connected to the airfoil 1 with various types of mechanical hardware such that the spoilers 6 may be mechanically/electrically, hydraulically, or pneumatically raised into the airstream on the upper surface 4 in order to interrupt the air flow over the upper surface 4 of an airfoil 1. As shown in FIG. 2, in order to movably connect spoilers 6 to an airfoil, for example, spoiler support brackets 7, actuators 9, spoiler actuator supports, bracing structures, pivot components, operational controls, fastening hardware, and additional hardware must be utilized. Additionally, where hydraulic or pneumatic actuation systems are employed, hydraulic hoses, fluids, couplings, valves, monitors, and instrumentation are required. Likewise, if a mechanical/electrical actuation system is used, in addition to the mechanical components, electrical circuitry, wiring, and instrumentation would be required. When employed, conventional spoilers 6, including the related structural, mechanical, and actuation hardware, as well as the structural portions of the airfoil 1 itself to which such components are fastened, are subjected to various static and dynamic forces, loads, pressures, stresses, strain, wear, and fatigue which result in reducing the life of the various components and accelerated failure.

The present invention permits controlled venting and transference of air pressure utilizing passive porosity between the upper surface 4 and the lower surface 5 of the leading edge region 2 of an airfoil.

In a presently preferred embodiment of the invention, as shown in FIGS. 3–5, preferably, at least one portion of the upper surface 4 and at least on portion of the lower surface 5 of the leading edge region 2 of an airfoil 1 have outer porous skin regions 17, said outer porous skin regions 17 preferably having a plurality of perforations therethrough. The corresponding interior portions of the leading edge region 2 of the airfoil 1, of a preferred embodiment of the invention, preferably have at least one upper plenum cavity 11 and at least one lower plenum cavity 12 corresponding to respective outer porous skin regions 17 on the upper surface 4 and lower surface 5. In a presently preferred embodiment, an upper plenum cavity may be preferably defined by, as shown in FIG. 4, a front plenum closure 22 preferably positioned relatively parallel with the leading edge 19 of the airfoil 1 and the front spar 16, two relatively vertical plenum walls 14 which are preferably relatively perpendicular to the front plenum closure 22, the front spar 16, a plenum deck 13, and the interior of the upper surface 4 of the airfoil 1. In a presently preferred embodiment, a lower plenum cavity region 12 is similarly defined except that the lower plenum cavity region 12 is enclosed by the interior of the lower surface 5 of the airfoil 1. As will be appreciated by those skilled in the art, various alternative plenum cavity enclosures, types of enclosures, and locations of such enclosures may be used to achieve the advantages of the present invention.

In a preferred embodiment, air pressure formed on the outer upper surface 4 of the outer porous skin region 17 on the leading edge region 2 of the airfoil 1 will preferably cause, through the passive transmission of air pressure through the porous skin regions 17, certain air pressures to develop in upper plenum cavities 11 corresponding to the respective outer porous skin regions 17. Similarly, air pressure formed on the outer lower surfaces 5 of the outer porous skin regions 17 on the leading edge region 2 of the airfoil 1 will preferably cause, through the passive transmission of air pressure through the outer porous skin regions 17 on the lower surface 5, certain air pressures to develop in the lower plenum cavities 12 corresponding to the respective outer porous skin regions 17.

The air pressure in an upper plenum cavity 11 directly correlates to the air pressure on the corresponding outer upper surface 4 of the leading edge region 2 of an airfoil. Similarly, the air pressure in a lower plenum cavity 12 directly correlates to the air pressure on the corresponding outer lower surface 4 of the leading edge region 2 of an airfoil. The controller interaction and communication between the air pressures in the respective corresponding upper plenum cavities 11 and lower plenum cavities 12 through an opening, hole, and/or channel 27 between the respective corresponding upper and lower plenum cavities 11 and 12 will effect the resulting air pressure on the corresponding segments of the upper surface 4 and lower surface 5 of an airfoil and may be controlled and regulated thereby. In one presently preferred embodiment of the invention, a plurality of valve means 15, FIGS. 4–6, preferably link upper plenum cavities 11 with corresponding lower plenum cavities 12. Almost any type of valve or combination f valves could be used. A representative example of types of valves that may be utilized include, but are not limited to, slider valves, butterfly valves, and/or linear actuated valves. Valve means 15 are preferably utilized to permit air pressure developed in corresponding upper plenum cavities 11 to passively interact with air pressure developed in corresponding lower plenum cavities 12.

Valve means 15, and pressure monitoring sensors in said upper and lower plenum cavities 11 and 12 or on respective upper surface 4 and lower surface 5 regions, are preferably connected to a microprocessor, artificial intelligence, or similar device, in order to accurately monitor air pressures, open, close, and modulate valves, and control the passive transfer of air pressure in and between respective upper and lower plenum cavities 11 and 12 (and the corresponding upper and lower surfaces 4 and 5). The air pressures developed in respective upper plenum cavities 11 and lower plenum cavities 12 may preferably be determined by sensors producing outputs or signals which may be correlated by the microprocessor, artificial intelligence, or similar device, to determine, track and passively control the corresponding air pressures on the respective upper and lower surfaces 4 and 5.

Figure 6:
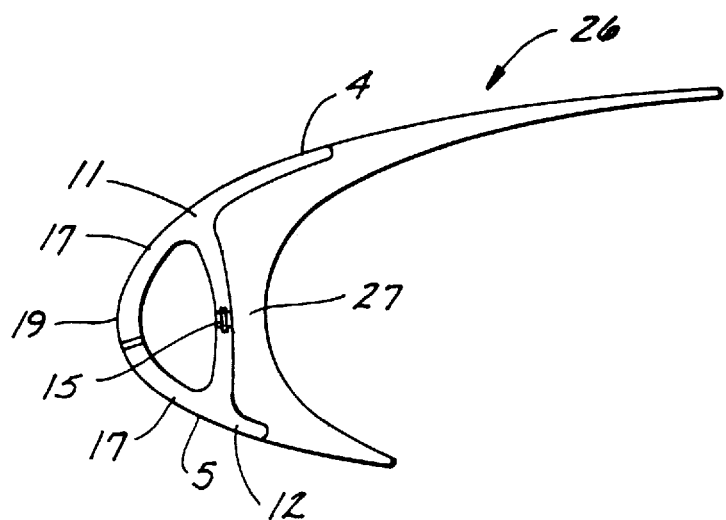
FIG. 6 is a cross sectional view of the leading edge portion of an aircraft wing utilizing an alternative preferred embodiment of the present invention.
Figure 7:
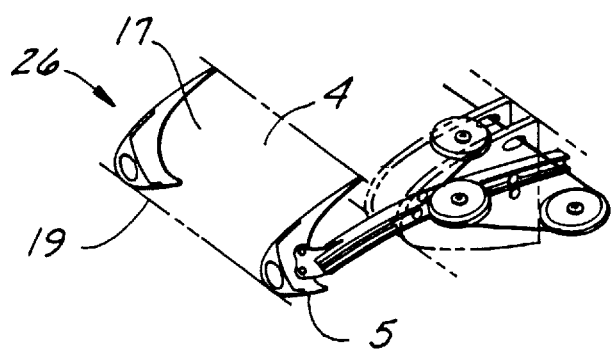
FIG. 7 is a cutaway perspective view of the leading edge slat portion of the aircraft wing of FIG. 6 utilizing the preferred embodiment of the present invention.

An alternative preferred embodiment of the present invention is to incorporate the present invention in a leading edge slat 26 of an airfoil, as commonly used on commercial aircraft, which is positioned on the leading edge 19 of the leading edge region 2 of an aircraft airfoil as shown in FIGS. 6 and 7.

Valve means 15 may preferably be incorporated into the structure of the leading edge region 2 of an airfoil in many ways including, for example, by being preferably placed in a plenum deck 13, FIGS. 4–5, intermediate an upper plenum cavity 11 and lower plenum cavity 12, by being positioned in a channel 27, FIG. 6, intermediate an upper plenum cavity 11 and lower plenum cavity 12, or in other ways as will be obvious to those skilled in the art. As will be appreciated by those skilled in the art, there are a variety of positions, locations and methods of employing valves 15 in the present invention to achieve the advantages of the present invention. Additionally, numerous type of valves and valve methods known to those skilled in the art will work to accomplish the advantages and intended results of the present invention including, for example, aircraft cabin pressure type valve regulation methods and sliding plate valve mechanisms.

In the present invention, the types of airfoils utilized and the desired applications and objectives will be useful in determining the quantity and location of upper 11 and lower 12 plenum cavities utilized and the locations on the upper surface 4 and lower surface 5 of the leading edge region 2 upon which outer porous skin regions 17 should be positioned. These factors will also affect the determination of which outer porous skin regions 17 and upper and lower plenum cavities, 11 and 12, will correspond to each other and the proximity of each respective element to each other. Additionally, such factors will also effect the manipulation and manner of actuating and modulating valves 15 in a particular embodiment to achieve the advantages and results desired of the present invention.

As will be further appreciated by those skilled in the art, depending upon the application and desired effect upon the lift control of a particular airfoil, numerous variations, combinations, and locations of a plurality of porous skin regions 17 and upper and lower plenum cavities 11 and 12 of the present invention may be utilized to achieve a variety of varying results. For example, depending upon the application, if a desired result of the present invention is to control roll, it may be preferable to locate the outer porous skin regions 17 closer to the tip of the leading edge 19 of the wing. If a spoiler effect is desired, depending upon the type and magnitude of spoiler effect desired, it may be preferable to incorporate outer porous skin regions 17 over a larger portion of the upper and lower surfaces, 4 and 5, of the leading edge region 2. Depending upon the particular application and desired results, it may be preferable to correspond each outer porous skin region 17 with each corresponding upper plenum cavity 11 and lower plenum cavity 12. It may also be desirable to correspond a plurality of porous skin regions 17 on the upper surface 4 with a lesser number of porous skin regions 17 on the lower surface 5, or the reverse. Furthermore, it may be preferable to vary the sizes, locations, types and combinations of porous skin regions 17 and upper and lower plenum cavities 11 and 12.

One presently preferred embodiment of the invention, FIG. 4, utilizes a plurality of outer porous skin regions 17 and corresponding upper 11 and lower 12 plenum cavities.

As will be appreciated by those skilled in the art, in such a preferred embodiment, any combination of valves 15 may preferably be opened, closed, or modulated at any one time in a multiplicity of combinations in order to control lift by, for example, uniformly dumping over the area of the outer porous skin regions 17 on the upper surface 4, dumping lift in a predefined inharmonic manner, dumping lift in a serial manner, or manipulating the lift characteristics to reduce altitude gain and/or speed. Of course, the variations that may be obtained with respect to the actuation of independent valves or series of valves, the configuration and location of corresponding outer porous skin regions 17, the configuration and location of corresponding upper and lower plenum cavities 11 and 12, and the duration of actuation or modulation of particular valves 15, are relatively limitless. Additional examples of uses and variations of the present invention include, for example, (a) the actuation of only a single valve 15 independently in order to achieve certain roll or pitch control characteristics by altering the air pressure on a specific portion of the leading edge region 2 of an airfoil 1, (b) the actuation of a selected set of valves 15 in order to achieve certain desired roll, pitch or yaw control, (c) the actuation and modulation of valves 15 in a selected order and duration in order to obtain roll, pitch, yaw, or other desired characteristics through lift control, (d) the actuation of certain or all valves 15 based upon predetermined specific parameters relating to air flow changes experienced on the upper 4 and lower 5 surfaces of an airfoil 1, (e) the actuation of certain or all valves 15 based upon such variables as velocity, flow, altitude, temperature, density, pressure, time, humidity, mass, or other variables, which may effect the characteristics desired, and (f) the actuation of certain valves 15 in order to decrease lift to facilitate greater engine power requirements.

As will be appreciated by those skilled in the art, the present invention is applicable to most applications where it is desirable to control, reduce, modify, vary or otherwise effect lift on an airfoil including, by way of example, commercial aircraft, military aircraft, personal aircraft, high performance automobiles, high performance water craft, helicopters, and hydrofoils.

Variations and modifications of the present invention will be apparent to those skilled in the art and the claims are intended to cover all variations and modifications falling within the true spirit and scope of the invention.

I claim:

1. A lift management device for an airfoil, the airfoil comprising a leading edge region and having interior and exterior portions, the exterior portion having upper and lower surfaces, the lift management device comprising:
    an outer porous skin region on the upper surface of the leading edge region;
    an outer porous skin region on the lower surface of the leading edge region;
    an upper plenum cavity disposed in the interior portion of the airfoil in fluid communication with the outer porous skin region on the upper surface of the leading edge region;
    a lower plenum cavity disposed in the interior portion of the airfoil in fluid communication with the outer porous skin region on the lower surface of the leading edge region;
    means for connectably coupling the upper plenum cavity with the lower plenum cavity for enabling fluid communication therebetween; and
    means for controllably monitoring and regulating the means for connectably coupling the upper plenum cavity with the lower plenum cavity in order to control the passive transference of air between the upper plenum cavity and the lower plenum cavity.

2. The lift management device for an airfoil according to claim 1 wherein said means for connectably coupling the upper plenum cavity with the lower plenum cavity is a valve.

3. The lift management device for an airfoil according to claim 2 wherein the upper plenum cavity and the lower plenum cavity are disposed in the interior portion of the leading edge region of the airfoil.

4. The lift management device for an airfoil according to claim 1 further comprising a channel disposed between the upper plenum cavity and the lower plenum cavity.

5. The lift management device for an airfoil according to claim 4 wherein the means for connectably coupling said upper plenum cavity with the lower plenum cavity is a valve.

6. A lift management device for an airfoil according to claim 5 wherein the valve is disposed in the channel between the upper plenum cavity and the lower plenum cavity.

7. The lift management device for an airfoil according to claim 6 wherein the upper plenum cavity and the lower plenum cavity are disposed in the interior portion of the leading edge region of the airfoil.

8. The lift management device for an airfoil according to claim 1 wherein the means for controllably monitoring and regulating the means for connectably coupling the upper plenum cavity with the lower plenum cavity is a microprocessor.

9. A lift management device for an airfoil, the airfoil comprising a leading edge region and having interior and exterior portions, the exterior portion having upper and lower surfaces, the lift management device comprising:
    at least one outer porous skin regions on the upper surface of the leading edge region;
    at least one outer porous skin regions on the lower surface of the leading edge region;
    at least one upper plenum cavity disposed in the interior portion of the airfoil in fluid communication with the corresponding outer porous skin regions on the upper surface of the leading edge region;
    at least one lower plenum cavity disposed in the interior portion of the airfoil in fluid communication with the corresponding outer porous skin regions on the lower surface of the leading edge region;
    at least one valve means for connectably coupling the corresponding upper plenum cavities with the corresponding lower plenum cavities for enabling fluid communication therebetween; and
    means for controllably monitoring and regulating the valves in order to control the passive transference of air between the corresponding upper plenum cavities and the corresponding lower plenum cavities.

10. A lift management device for an airfoil according to claim 9 wherein the upper plenum cavities and the lower plenum cavities are disposed in the interior portion of the leading edge region of the airfoil.

11. A lift management device for an airfoil according to claim 9 wherein the means for controllably monitoring and regulating the valves in order to control the passive transference of air between the corresponding upper plenum cavities and the corresponding lower plenum cavities is a microprocessor.

12. A lift management device for an airfoil according to claim 9 further comprising at least one channel disposed between the corresponding upper plenum cavities and the corresponding lower plenum cavities.

13. A lift management device for an airfoil according to claim 12 wherein the valves are disposed in the channels between the corresponding upper plenum cavities and the corresponding lower plenum cavities.

14. A lift management device for an airfoil, the airfoil comprising a leading edge slat having interior and exterior portions, the exterior portion having upper and lower surfaces, the lift management device comprising:

an outer porous skin region on the upper surface of the leading edge slat;

an outer porous skin region on the lower surface of the leading edge slat;

an upper plenum cavity disposed in the interior portion of the leading edge slat in fluid communication with the outer porous skin region on the upper surface of the leading edge slat;

a lower plenum cavity disposed in the interior portion of the leading edge slat in fluid communication with the outer porous skin region on the lower surface of the leading edge slat;

means for connectably coupling the upper plenum cavity with the lower plenum cavity for enabling fluid communication therebetween; and means for controllably monitoring and regulating the means for connectably coupling the upper plenum cavity with the lower plenum cavity in order to control the passive transference of air between the upper plenum cavity and the lower plenum cavity.

15. The lift management device for an airfoil according to claim 14 wherein said means for connectably coupling the upper plenum cavity with the lower plenum cavity is a valve.

16. The lift management device for an airfoil according to claim 14 further comprising a channel disposed between the upper plenum cavity and the lower plenum cavity.

17. The lift management device for an airfoil according to claim 16 wherein the valve is disposed in the channel between the upper plenum cavity and the lower plenum cavity.

18. The lift management device for an airfoil according to claim 15 wherein the means for controllably monitoring and regulating the means for connectably coupling the upper plenum cavity with the lower plenum cavity is a microprocessor.

19. A passive porosity lift management process for an airfoil comprising:

passively transferring air on an upper surface of a leading edge region of the airfoil through at least one outer porous skin region disposed on the upper surface of the leading edge region into at least one upper plenum cavity disposed in an interior portion of the airfoil;

passively transferring air on a lower surface of the leading edge region of the airfoil through at least one outer porous skin region disposed on the lower surface of the leading edge region into at least one lower plenum cavity disposed in the interior portion of the airfoil;

passively transferring air between the upper plenum cavities and the lower plenum cavities; and controlling, regulating and monitoring the passive transference of air between the upper plenum cavities and the lower plenum cavities.

20. The passive porosity lift management process for an airfoil according to claim 19 wherein the air between the upper plenum cavities and the lower plenum cavities is passively transferred through at least one valve.

21. The passive porosity lift management process for an airfoil according to claim 20 wherein the passive transference of air between the upper plenum cavities and the lower plenum cavities is controllably monitored and regulated by a microprocessor.

* * * * *